Patented May 4, 1937

2,079,490

UNITED STATES PATENT OFFICE 2,079,490

MALEIC ACID FROM DIOLEFINES

Courtney Conover, St. Louis, Mo., assignor to Monsanto Chemical Company, St. Louis, Mo., a corporation of Delaware No Drawing. Application April 1, 1935,
Serial No. 14,122

2 Claims. (Cl. 260—116)

This invention relates to the preparation of aliphatic dicarboxylic acids and it has particular relation to the preparation thereof from diolefinic compounds by controlled oxidation.

The main objects of the invention are to provide:

A process of preparing aliphatic dicarboxylic acids which involves the use, as the source of primary material, of relatively inexpensive materials for which there is at present but little commercial application;

A process of preparing aliphatic dicarboxylic acids which admits of the use of simpler and more durable catalysts of oxidation than can be employed in the methods of preparation heretofore available;

A process as above described which is simple and inexpensive to operate and which results in relatively high yields of comparatively pure product.

These and other objects will be apparent from perusal of the following description:

The preparation of maleic acid by controlled oxidation of such aryl hydrocarbons as benzene has heretofore been suggested. However, considerable difficulty is involved in the oxidation of these comparatively stable aromatic compounds and as a result highly active and comparatively sensitive catalysts are required. These catalysts, under the conditions of operation, tend to deteriorate and as a result their activity is soon lost or at least greatly reduced. Furthermore, the degree of oxidation of the aromatic compounds is comparatively difficult to control and the preparation of maleic acid therefrom was usually attended by the formation of large amounts of by-products such as carbon dioxide and tar products which could not be commercially employed.

The present invention is based on the discovery that unsaturated aliphatic dicarboxylic acids of the type of maleic acid may be easily and economically prepared by controlled oxidation of diolefines or their polymers by passing the vapors of the diolefine, admixed with air or other oxygen containing gas, over a suitable oxidation catalyst. It is to be understood that the term "maleic acid" as used herein includes also the anhydride. It is even probable that the anhydride rather than the acid is formed under the conditions of reaction.

The preparation of maleic acid from cyclopentadiene, or condensation products and homologues thereof, constitute specific examples of applications of the present invention. Cyclopentadiene is a comparatively well known hydrocarbon, boiling at about 42° C. and being obtainable by distillation of certain fractions of cracked petroleum by methods well understood in the art and which are not a part of the present invention and therefore will not be described.

The reaction involves splitting or rupturing of the cyclical nucleus, accompanied by oxidation of the residue, to produce the dicarboxylic acid or perhaps more accurately, the anhydride of the acid. The term "dicarboxylic acid" as used herein is to be understood to include the anhydride as well as the free acid.

In the case of cyclopentadiene the reaction probably may be represented by the equation:

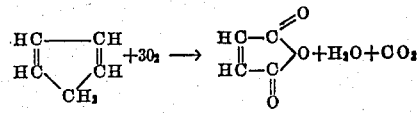

From this equation it will be apparent that the reaction is accompanied by the simultaneous removal of $CH_2$ from the hydrocarbon molecule, attended by oxidation thereof to produce carbon dioxide and water.

Cyclopentadiene exhibits a strong tendency to polymerize or condense with itself to form dicyclopentadiene and higher polymers which possess comparatively high boiling points. However, I have found that these materials may be used in like manner as raw materials, either directly or after depolymerization.

Any good catalyst for oxidation, suitable for the oxidation of organic materials to form carboxylic acids, e. g., for the oxidation of benzene to maleic acid, may be employed in the preparation of maleic acid according to my invention. Catalysts containing as their main reactive components a metal from the fifth or sixth group of the Periodic Table are particularly applicable. Among the compounds which by actual test have been found to be catalysts of oxidation of cyclopentadiene or its polymers to maleic acid, may be mentioned certain compounds of vanadium and molybdenum and mixtures and compounds of these two elements in varying relative proportions. The oxides and mixed oxides of these metals are particularly applicable for the purpose. It will also be understood by those skilled in the art that these catalytic substances may be employed either with or without conventional carriers such as alundum and materials rich in silica and including fused silica, pumice, etc. The catalysts may further be admixed with suitable inert diluents as well understood in the art. It will, of course, be appreciated that the specific catalyst is not an essential part of the present invention but that the applicant contemplates any of the conventional catalysts employed in oxidations of this type well understood by those skilled in the art.

In the process of preparing maleic acid from cyclopentadiene or its polymers and homologues, the primary hydrocarbon is subjected to vaporization and the vapors are then admixed with air or other oxygen containing gas in a suitable ratio. Preferably, in the case of air, the ratio of hydrocarbon to oxidizing gas is approximately within the range of 1:20 or 1:30 by weight. Of course, higher proportions of air may be employed but this is not generally economical practice because the excess air simply constitutes a diluent which decreases the output from a given size of apparatus. Higher ratios of hydrocarbon may also be employed while avoiding explosive conditions. Even explosive mixtures are not precluded because by careful control of the reaction temperatures and by employing suitable safety devices well known to the art they may be employed, but in general it is preferable to employ non-explosive mixtures. A ratio of about 1:25 is very satisfactory.

The catalyst (for example, a vanadium oxide in a highly dispersed form) is supported in a convenient tube or a plurality of tubes of conventional design which, preferably, are provided with some convenient means for maintaining uniformity of temperature. The catalyst may be prepared from hydrated gel of vanadic acid by the aerogel process involving displacement of the water in the hydrated gel with alcohol, followed by heating in an autoclave to a temperature above the critical value of alcohol. The process as applied to silica gel is described in an article by S. S. Kistler and A. G. Caldwell, Industrial and Engineering Chemistry, volume 26, No. 6, page 658.

In general, the temperature employed to produce maleic acid should be within the range of approximately 400° C.–525° C. because at materially lower temperatures than these the reaction is unduly slowed up, at least with most catalysts, although it is conceivable that with more reactive catalysts than now available lower temperatures might be employed. Materially higher temperatures are unnecessary. With vanadium oxide or mixtures thereof with chromium or molybdenum oxide best results are obtained when operating within the range of approximately 450° C.–500° C. In no event should the temperature be so high as to cause excessive decomposition of the raw material or of the reaction product. It will be understood that after the reaction is initiated this temperature is maintained by heat generated in the reaction itself and in most cases it will be necessary to provide means for carrying away the excess heat.

The time of contact between the reaction mixture of gases and the catalyst may vary over a considerable range without materially affecting the results obtained. In general, the time of contact should be sufficient to insure that all or nearly all of the hydrocarbon initially introduced is subjected to oxidation before emerging from the catalyst. By actual experience it has been found that the time of contact ranging from approximately 0.2 second to 0.5 second is satisfactory. This, of course, may be obtained by controlling the depth of the catalytic bed or by controlling the rate of flow through the catalytic mass in conventional manner.

Open chain olefines, including pentadiene, isoprene and butadiene may be substituted in the above process for cyclic diolefines, also volatilizable diolefinic polymers such as are obtained in the cracking of petroleum particularly by the vapor phase process. Such materials are often responsible for the gum formation in gasoline and can be separated from unrefined gasoline by various known means, as for example by passing the hydrocarbon vapors over activated clay which tends to induce polymer formation of diolefinic solutions which are then separated by their increased boiling point or decreased solubility.

The recovery of the maleic acid or anhydride from the reaction gases is effected by the same methods employed in the recovery of the acid obtained by controlled air oxidation of benzene.

The process, as thus described, is highly satisfactory from a commercial standpoint of view for the preparation of maleic acid because the primary material (cyclopentadiene or its homologues and polymers) is comparatively inexpensive and at the present time it has but slight commercial market. The yields are usually higher than obtainable from benzene with the same catalysts, and the product is of high quality, comparing favorably with the best obtainable by oxidation of benzene or similar aromatic hydrocarbons. This is surprising because the catalysts are generally applied to aromatic compounds. Also, the catalysts employed in effecting the reaction are comparatively inexpensive to obtain and they are materially more durable and rugged than those applicable to the oxidation of benzene to produce comparable yields to those obtained from cyclopentadiene hydrocarbons.

It will be appreciated that in the preceding description and the following claims, the terms "maleic acid" and "maleic acid anhydride" are often used interchangeably. It is probable that in the converter output the anhydride is present to the exclusion of the acid or at least it predominates. However, it is immediately converted into the acid upon contact with water. Therefore, the terms "maleic acid, unsaturated dicarboxylic acid, etc." are to be construed generically.

Although I have shown and described only the preferred embodiments of the invention it is to be understood that these are merely given for purposes of illustration and that numerous modifications may be made therein without departure from the spirit of the invention or the scope of the appended claims.

It is to be understood that the diolefines need not be pure but may be present in a hydrocarbon mixture which is rich in diolefines and that the expression "diolefinic compounds" contemplates such mixture.

What I claim is:

1. A method of preparing maleic acid to the substantial exclusion of other organic compounds which comprises oxidizing a vaporous mixture of approximately one part by weight of a cyclic diolefine containing at least five carbon atoms with at least twenty parts by weight of air in the presence of a catalyst containing as its principal component vanadium oxide, at a temperature within the range of 400 to 525° C.

2. A method of preparing maleic acid to the substantial exclusion of other organic compounds which comprises subjecting a material selected from the group consisting of cyclopentadiene, polymers and homologues thereof, to oxidation with air and in the presence of a vanadium oxide catalyst containing at least one of the elements selected from a group consisting of chromium and molybdenum, at a temperature within the range of 400° C.–525° C. for such a period of time as is required to effect substantially complete conversion of the hydrocarbon, the portion by weight of air being at least twenty times that of the hydrocarbon.

COURTNEY CONOVER.